United States Patent [19]

Carmichael et al.

[11] Patent Number: 4,813,063
[45] Date of Patent: Mar. 14, 1989

[54] PHOTOGRAPHIC CASSETTE

[75] Inventors: Even P. Carmichael; John J. Niedospial; Roger G. Covington; Bruce R. Muller, all of Rochester, N.Y.

[73] Assignee: Eastman Kodak Company, Rochester, N.Y.

[21] Appl. No.: 125,315

[22] Filed: Nov. 25, 1987

[51] Int. Cl.$^4$ ............................................. G03B 42/04
[52] U.S. Cl. .................................... 378/182; 378/184; 378/187
[58] Field of Search ..................... 378/182, 184, 187; 354/275, 276, 278

[56] References Cited

U.S. PATENT DOCUMENTS

| | | | |
|---|---|---|---|
| 3,784,835 | 1/1974 | Schmidt | 378/187 |
| 3,870,889 | 3/1975 | Schmidt | 378/187 |
| 4,186,308 | 1/1980 | Erikson | 378/187 |
| 4,198,009 | 4/1980 | Turner | 378/187 |
| 4,444,484 | 4/1984 | Best et al. | 378/182 |
| 4,688,243 | 8/1987 | De Felice et al. | 378/187 |
| 4,763,346 | 8/1988 | Niedospial et al. | 378/187 |

Primary Examiner—Carolyn E. Fields
Assistant Examiner—David P. Porta
Attorney, Agent, or Firm—James A. Smith

[57] ABSTRACT

An improved photographic cassette is disclosed having a pressure plate adjacent a rear cover wall thereof provided with laterally extending tabs on opposite side edges thereof. The cassette further has a floating plate adjacent a front cover wall which is unsecured to the front cover wall at least at all portions thereof except the center portion. The floating plate has ears laterally extending from the side edges thereof in register with and spaced from the tabs. The cassette has push-bar mechanisms adapted when the push-bar mechanisms are moved to an extended position to enter the space between the ears and tabs and to engage the tabs and move the pressure plate toward the rear cover wall, and to override the ears for latching the floating plate to the front cover wall whereby the pressure and floating plates are spaced apart for allowing a sheet to freely move into or exit the cassette.

11 Claims, 6 Drawing Sheets

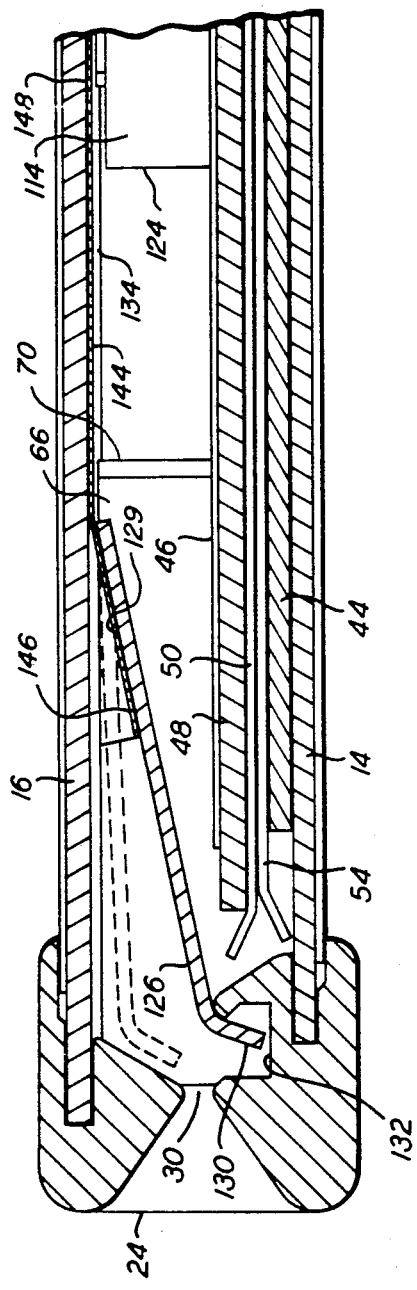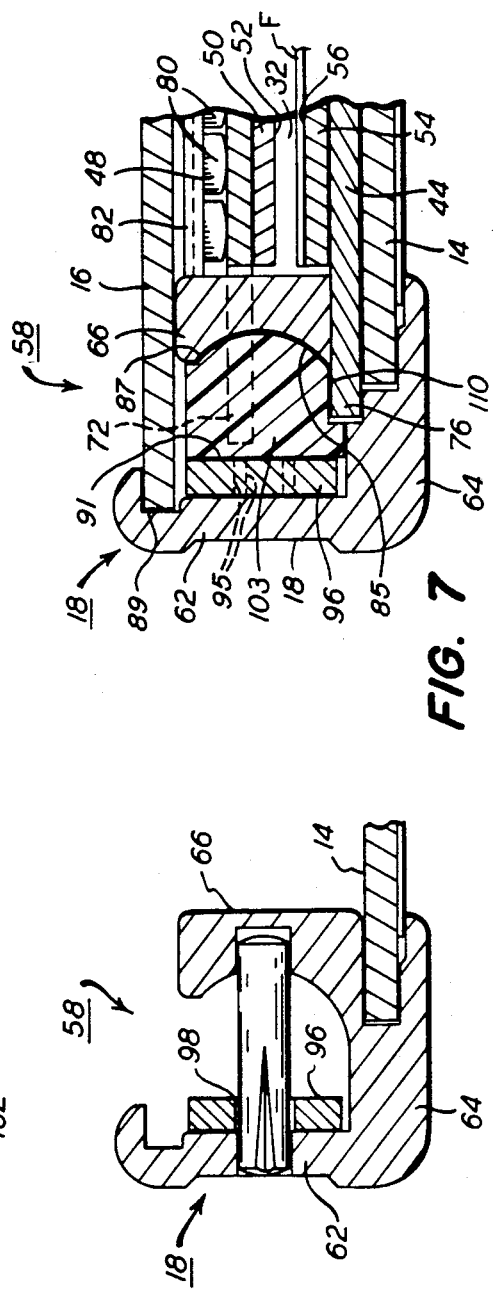

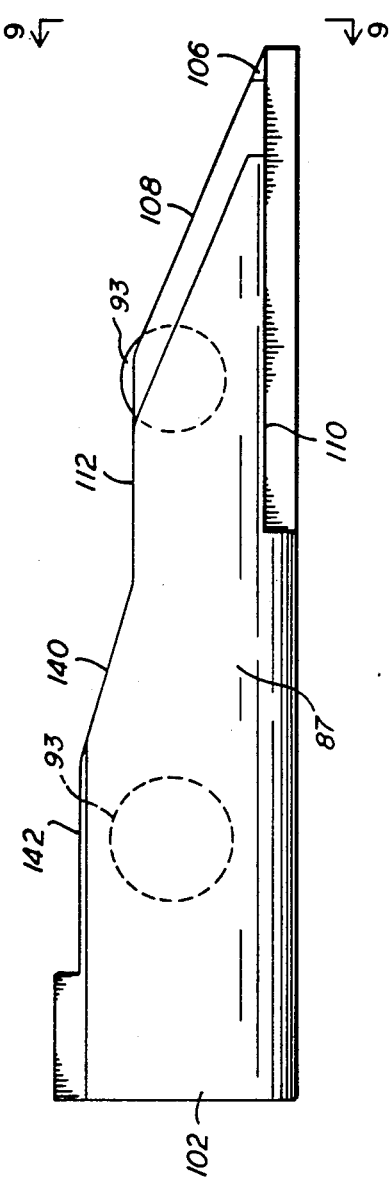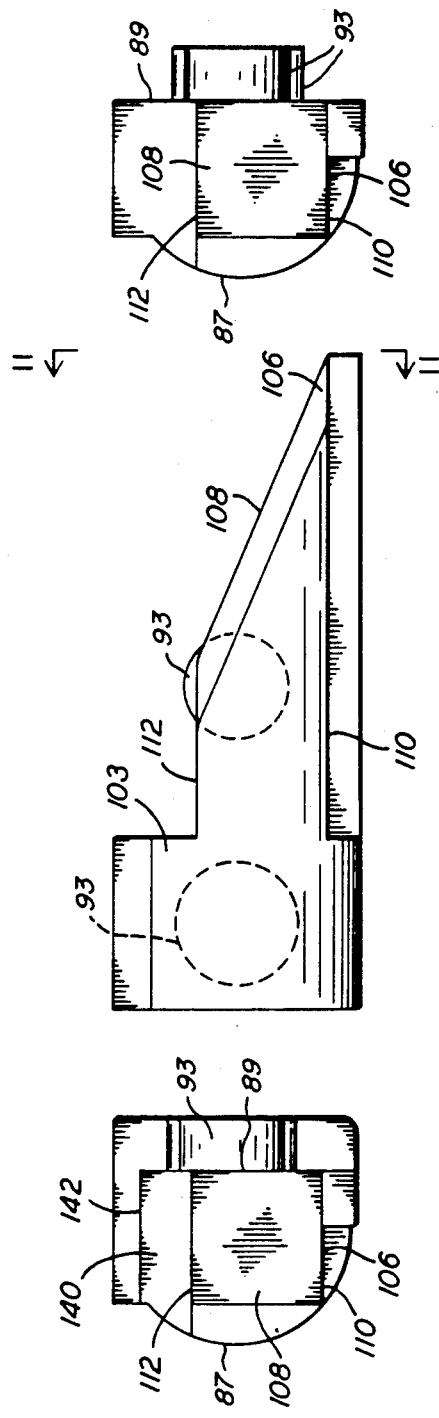

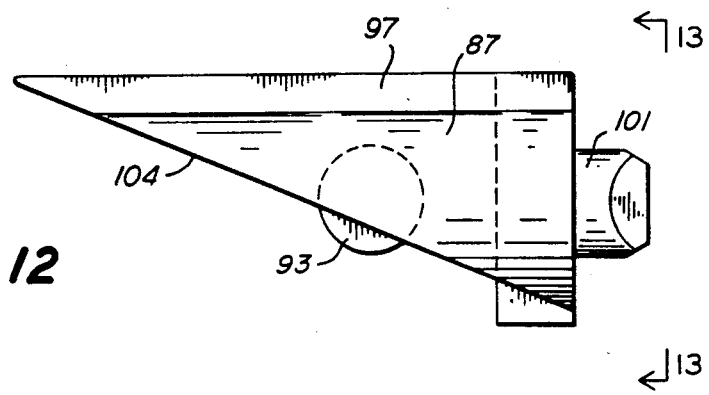
FIG. 12
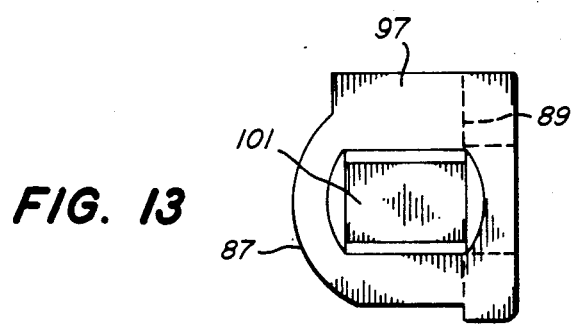
FIG. 13
FIG. 14
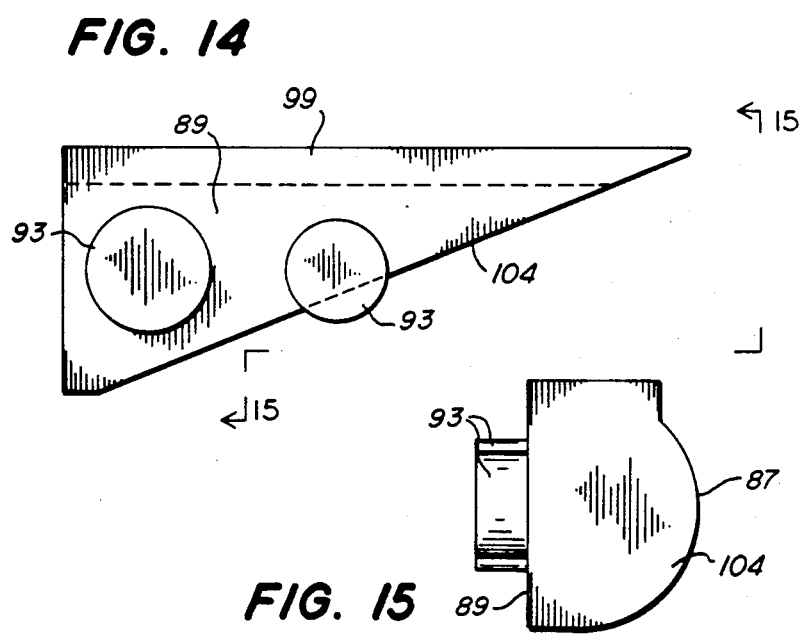
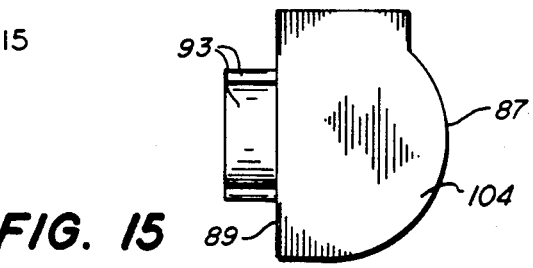
FIG. 15

PHOTOGRAPHIC CASSETTE

BACKGROUND OF THE INVENTION

1. Field of the Invention

The present invention relates generally to photographic cassettes, and more particularly to an improved photographic cassette, such as an x-ray film sheet cassette.

2. Description of the Prior Art

U.S. Pat. Nos. 3,784,835, 3,870,889 and 4,444,484 describe x-ray film sheet cassettes of the type suitable for day-light loading and unloading in cooperation with film supplying and film processing apparatus. Such cassettes typically have a rectangular solid configuration defined by six orthogonally joined walls which enclose a chamber for accommodating an x-ray film sheet. In one of those walls is a light-shielded slot through which a film sheet can pass into and out of the chamber. Within the chamber, in alignment with the slot, are a pair of opposing planar screen surfaces relatively moveable toward and away from each other to prevent and permit, respectively, movement of the film sheet therebetween. One of those surfaces is secured to a wall adjacent thereto, and the opposed surface is forced by a spring or other means toward the other to clamp a film sheet therebetween. Means are provided for urging the two surfaces apart in response to placing the cassette into operative relationship with suitably configured film supplying or film processing apparatus, thereby allowing a film sheet to slide between those surfaces when the cassette is positioned for loading or unloading. When so positioned, the cassette is intended to be loaded or unloaded by the simple expedient of letting a film sheet drop into or out of the chamber by force of gravity.

A problem with the aforementioned cassettes, particularly of the type shown in U.S. Pat. No. 4,444,484, is that when an external force is applied to the weight-bearing cassette front cover wall by the weight of a portion of a patient's anatomy being x-rayed, such as an elbow, for example, the cover and screen secured thereto are boxed resulting in good line film-to screen contact at the center of the longitudinal length of the cassette, but a progressive loss in film-to-screen contact upon outward progression to the ends of the cassette. This loss in film-to-screen contact is due to the screen ends secured to the bowed cover withdrawing from the film as it is pressed toward the boxed cover by the pressure applying means.

The aforementioned problem of loss of film-to-screen contact at the screen ends is solved by a cassette construction of the type disclosed in U.S. patent application Ser. No. 879,245 by the same assignee of the present invention. The cassette disclosed in U.S. Ser. No. 879,245 is constructed so that the screen adjacent the bowed front cover wall facing the x-ray machine is free-floating, at least those portions thereof extending progressively outwardly from the center of the cassette, when the cassette is in a film-loaded position for exposure. In U.S. Ser. No. 879,245, the specific mechanism for separating the pressure and floating plates to allow a film sheet to freely enter or exit the passageway therebetween comprises metal bell crank levers, each comprising two longitudinally projecting arms which are joined to form an obtuse angle therebetween. Upon pivotable movement of the bell crank levers, one of the arms thereof engages and lifts a tab on the pressure plate, and the other arms each have a lug thereon that engages a complementary ear on the floating plate for separating the pressure and floating plates.

The aforementioned problem is better solved by the present invention by a mechanism that is of simple design and construction, thoroughly reliable and efficient in operation, more durable, more dirt free during usage, constructed of fewer parts, and more economical to manufacture.

SUMMARY OF THE INVENTION

An object of the present invention is to provide an improved photographic cassette of the type having one end wall with a slot therein through which a film sheet is moveable therethrough along an inlet path. The cassette has an opposite end wall and opposite side walls joining the one and opposite end walls wherein each side wall comprises a channel. The cassette has opposing front and rear cover walls joined to the end and side walls. The cassette further has a pressure plate adjacent the rear cover wall having laterally extending tabs on opposite sides thereof extending into the channels through cut-outs therein. The cassette has a floating plate adjacent the front cover wall. The pressure and floating plates have substantially planar interior surfaces in substantially parallel, facing relationship with each other to support a film sheet therebetween. The cassette further has pressure applying means for normally biasing the pressure plate toward the floating plate to press the sheet flat between the interior surfaces. The cassette further has a push-bar mechanism mounted in each channel for slidable movement between a normal retracted position and an extended position, and a spring in each channel coupled to the push-bar mechanism for urging it into its normal retracted position. The improvement in the x-ray cassette of this invention comprises:

ears laterally extending from the side edges of the floating plate in register with and spaced from the tabs; and ramps longitudinally spaced on each push-bar mechanism adapted when the push-bar mechanism is in its normal retracted position to be clear of the ears and tabs, and when the push-bar mechanism is moved to its extended position to enter the space between the ears and tabs and to engage the tabs and move the pressure plate toward the rear cover wall, and to override the ears for latching the floating plate to the front cover wall whereby the pressure and floating plates are spaced apart for allowing a sheet to freely move into or exit the cassette along the inlet path.

Another object of the invention is to provide an x-ray cassette wherein each channel has an asymmetrical cross-section, and each push-bar mechanism has a complementary asymmetrical cross-section for minimizing the frictional engagement surfaces between each push-bar mechanism and supporting channel.

Another object of the invention is to provide an improved light trap means for the x-ray cassette in which the light trap means comprises an elongate rectangular light shield having a lip along a front edge thereof nestable in a groove to prevent light from entering the entry slot of the cassette. The light shield has a shoulder at each end extending into a channel and into the path of a ramp, and a leaf spring extending from each shoulder rearwardly of the front edge onto a support member for biasing the lip into light-tight engagement with the groove.

Still another object of the invention is to provide a support member on each channel for precisely locating one of the pressure plate tabs extending through a cut-out in the channel so that the remaining pressure plate tabs are centered in complementary cut-outs whereby no dirt is generated by the remaining tabs and edges of the complementary channel cut-outs.

The invention, and its objects and advantages, will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 2 is a segmental section view of the light-lock mechanism taken substantially along line 2—2 of FIG. 1;

FIG. 3 is a section view taken substantially along line 3—3 of FIG. 1;

FIG. 7 is an enlarged segmental section view taken substantially along line 7—7 of FIG. 1 with the push-bar mechanism in its extended position;

FIG. 8 is a side elevational view of a push-button ramp;

FIG. 9 is an end view of the push-button ramp of FIG. 8;

FIG. 10 is a side elevational view of a ramp;

FIG. 11 is an end view of the ramp of FIG. 10;

FIG. 12 is a side elevational view of a wedge end;

FIG. 13 is an end view of the wedge end of FIG. 12;

FIG. 14 is a side elevational view of a wedge;

FIG. 15 is an end view of the wedge of FIG. 14;

DESCRIPTION OF A PREFERRED EMBODIMENT

Because certain parts of photographic cassettes and related apparatus are well known, the following description is directed in particular to those elements forming, cooperating directly with, or relating to the present invention. Elements not specifically shown or described herein are selectable from those known in the art, particularly as shown in U.S. Pat. No. 4,444,484 and U.S. patent application Ser. No. 879,245.

Figure 1:
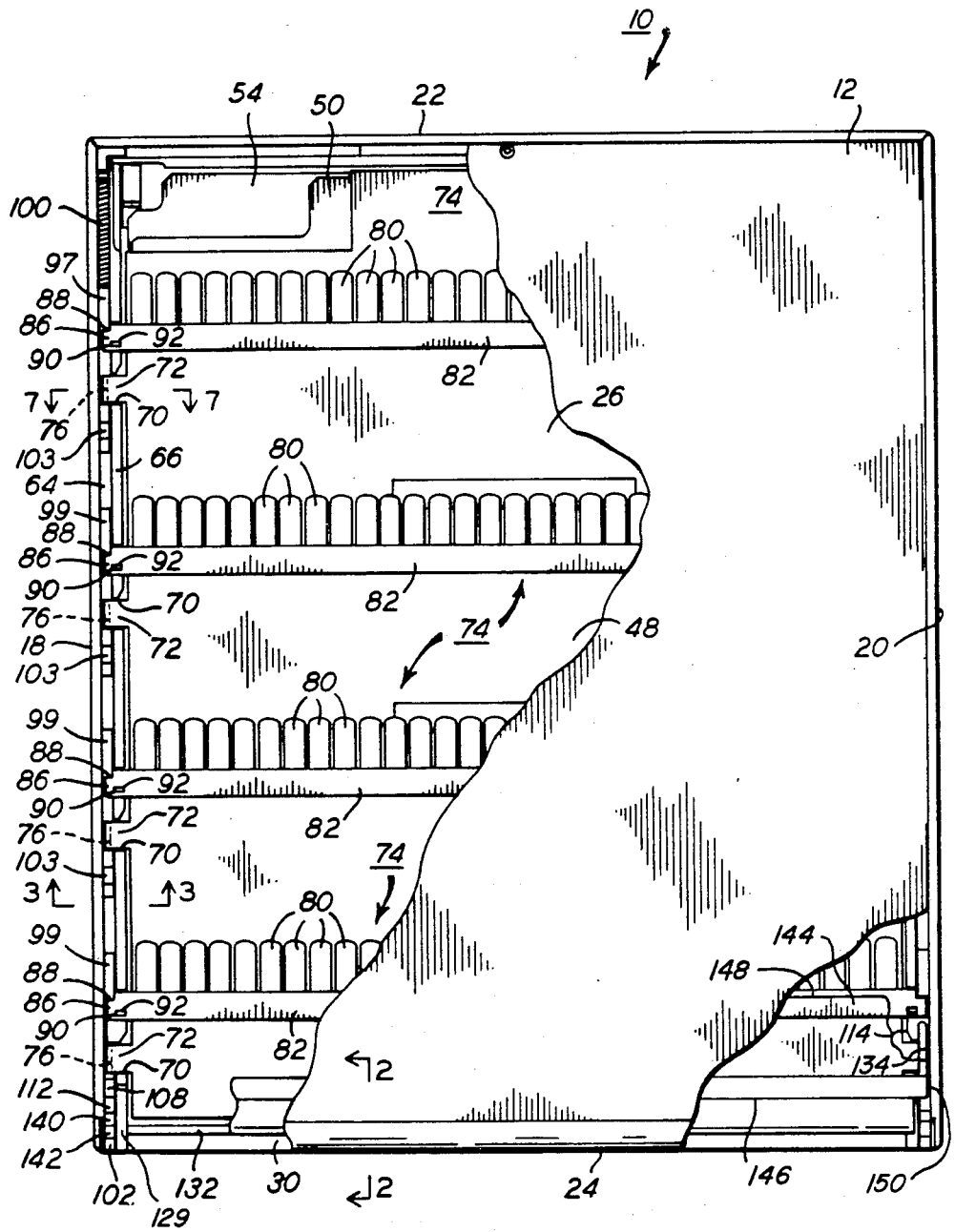
FIG. 1 is a top-plan view, with portions thereof broken away, of a photographic cassette constructed in accordance with a preferred embodiment of the present invention.

Illustrated in FIGS. 1 and 2 is a photographic cassette 10 designed to hold a film sheet F for exposure when positioned in operative relation to a source of x-ray radiation. The cassette includes a rectangular-solid-shaped housing 12 defined by six opaque walls 14, 16, 18, 20, 22 and 24 which are joined as shown to enclose a chamber 26 for accommodating the film sheet. Opposing front and rear cover walls 14, 16 are spaced from and parallel with each other so that when the cassette is oriented for an exposure, front or tube cover wall 14 faces the radiation source and rear cover wall 16 lies behind the film sheet. Joined to front and rear cover walls 14, 16 are opposing side walls 18, 20 and opposing end walls 22, 24. End wall 24 has a light-shielded elongate opening or slot 30 therein through which the film sheet can pass along a film path 32 into and out of chamber 26.

Located inside housing chamber 26, between and substantially parallel with front and rear cover walls 14, 16 is a pressure plate 48 made of magnesium or aluminum and mounted for movement toward and away from front cover wall 14. Secured to the front of pressure plate 48 is a sheet-like intensifier screen 50 similar in size and shape to film sheet F and having a forward-facing, substantially planar surface 52. Coated onto the rear of plate 48 is a layer of lead foil 46. Loosely placed onto the inner surface of front cover wall 14 is a floating plate 44 onto which a similar screen 54 is secured having a rearward-facing, substantially planar surface 56. Front floating plate 44 may have the center portion thereof secured to the inner surface of front cover wall 14 since good film-to-screen contact occurs at the center of the cassette whether front cover wall 14 is bowed by pressure applying means or not. However, portions of the floating plate surface adjacent the inner surface of front cover wall 14 and progressing outwardly from the center of the cassette must be loose relative to the inner surface of front cover wall 14 so that end portions of screen 54 and floating plate 44 will remain in contact with the film when front cover wall 14 is bowed, and will not withdraw therefrom. Planar surfaces 52 and 56 of screens 50 and 54 respectively thus face toward each other, so as to face opposite surfaces of film sheet F, when the film sheet is operatively disposed between the two screens.

As shown in FIGS. 1 and 2, housing side walls 18, 20 comprise channels 58, only one of which is shown extending longitudinally therein from a closed end at wall 22 to an open end at wall 24. Although the following description refers only to features of and parts associated with channel 58, it will be understood that the same description applies to corresponding features of and parts associated with the channel on the opposite side wall, which is a mirror image of channel 58. Channel 58 may be viewed as bounded on three sides by outer, medial, and inner sections 62, 64, 66 respectively of side wall 18. Spaced along inner section 66 are four rectangular cut-outs 70 opening toward rear wall 16. Cut-outs 70 are positioned and dimensioned to receive, loosely, complementary tabs 72 extending laterally from pressure plate 48, so as to locate plate 48 and screen 50 in registration with screen 54, and also guide movement of pressure plate 48 and screen 50 toward and away from screen 54 as the tabs ride forward and rearward, respectively, in the cut-outs. At least the two outer cut-outs further loosely receive complementary ears 76 laterally extending from side edges of floating plate 44.

Biasing pressure plate 48 forwardly, that is, toward front cover wall 14, is a plurality of spring assemblies 74 mounted between plate 48 and rear cover wall 16. Each spring assembly comprise a plurality of leaf springs 80 projecting longitudinally toward end wall 22 from a connecting bar 82 which extends transversally from side wall 18 to side wall 20. The laterally extending end portions 86 of bar 82 are loosely received by a cut-out 88 provided in inner section 66, and is located therein by a small projection 90 on section 66 protruding rearwardly through a mating aperture 92 in end portion 86, forming a pivot for the spring assembly. End portion 86 terminates in a rocker arm 94 which lies perpendicular to rod 82 and projects longitudinally toward end wall 22 in registration with medial section 64. Means are provided in channels 58 for engaging and rocking rocker arms 94, and with it the spring assemblies about projections 90, so as to increase the spring force biasing pressure plate 48 toward front cover wall 14. Retraction of the engaging and rocking means from arms 94 decreases or releases the spring force so that pressure plate 48 can be retracted or moved rearwardly without any or little opposition thereto by the spring assemblies.

The above-mentioned rocking means for rocker arms 94 comprises an elongate push bar 96 mounted, by means of a conventional pin-and-slot arrangement 98, for longitudinal sliding movement toward and away from end wall 24. To facilitate such movement with a minimum of friction and dirt generation, each channel is provided with an asymmetrical cross-section, by virtue of an arcuate inner surface 85 on inner section 66, as best seen in FIGS. 3 and 7. Wedges 97, 99 and ramps 102, 103 are mounted on push bar 96, and are each provided with arcuate side surfaces 87 that mate or nest in the arcuate inner surfaces 85 of inner section 66. The wedges and ramps are molded as unitary members out of a low friction material and the mating of the arcuate side and inner surfaces minimizes the frictional area between the slidable push bar 96, wedges and ramps and the stationary support channel.

The wedges 97, 99 and ramps 102, 103 are all mounted to push bar 96 by means of flat surfaces 89 thereon that abut a side surface 91 of push bar 96. The wedges and ramps each further have a pair of round pins 93 laterally extending from flat surface 89 into complementary openings 95 (FIG. 7) in push bar 96. Although the wedges and ramps do not have to be rigidly secured to the push bar, securement by adhesive or the like is preferred to facilitate assembly of the push bar into the cassette.

Figure 4:
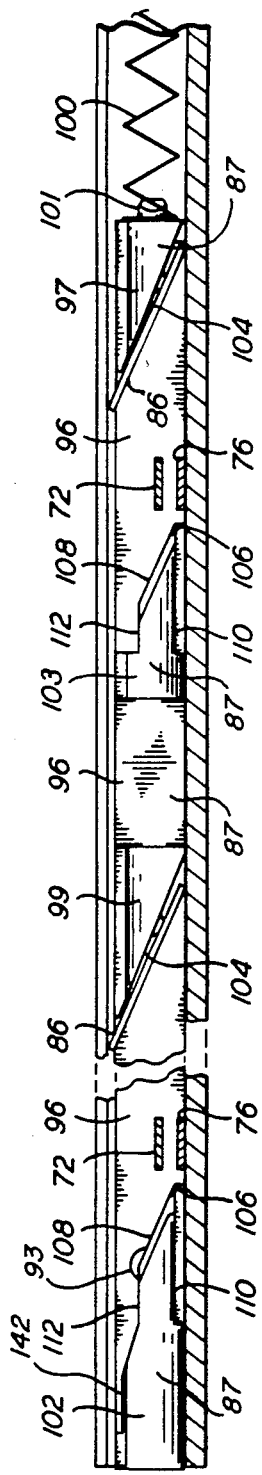
FIG. 4 is a segmental side elevational view taken substantially from line 4—4 of FIG. 1 with the push-bar mechanism in its normally retracted position.

Biasing bar 96 toward end wall 24 is a compression spring 100 disposed in channel 58 near end wall 22 and pushing against a post 101 at one end of end wedge 97, as seen in FIGS. 1 and 4. Fixed to the opposite end of the bar is a push-button ramp 102, one of two which normally lies in the open channel 58 flush with end wall 24. Bar 96 thus can be moved away from end wall 24, toward end wall 22, by pushing upon button 102 with enough force to overcome the opposing biasing influence of spring 100.

Interposed between end wedge 97 and push-button ramp 102 on bar 96 are a pair of spaced wedges 99 and a pair of spaced ramps 103. Each of the wedges 97, 99 has a slanted surface 104 facing the front cover wall. In the normal retracted position of bar 96, shown in FIGS. 1 and 4, wherein button 102 lies flush with end wall 24, slanted surfaces 104 engage arms 94 of the spring assemblies, thereby pivoting or rocking the spring assemblies clockwise about pivots 90 causing leaf springs 80 to be tensioned so as to increase the spring force biasing plate 48 toward front cover wall 14. When buttons 102 are depressed so as to move bars 96 to their extended positions, shown in FIG. 6, slanted surfaces are moved free or retracted from arms 94 allowing leaf springs 80 to return to their untensioned conditions so that little, if any, spring force is biasing pressure plate 48 toward front cover wall 14.

Figure 5:
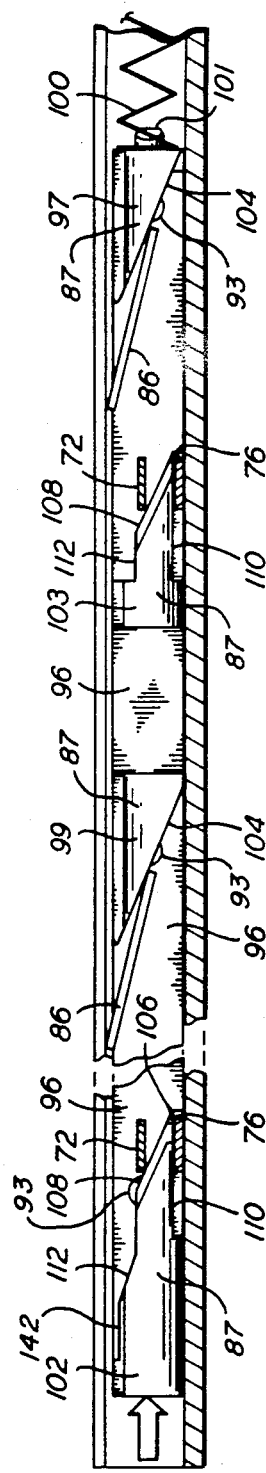
FIG. 5 is a view similar to FIG. 4 showing the push-bar mechanism partially moved toward its extended position.

Each of the ramps 102, 103, as seen in FIGS. 4–6 and 8–11, are provided with a sharp end 106 having an inclined surface 108 facing rear cover wall 16 and a flat recessed surface 110 facing the medial section 64. The inclined and flat surfaces 108, 110 respectively form a sharp acute angle. In the normal retracted position of bar 96, shown in FIGS. 1 and 4, wherein button 102 lies flush with end wall 24, the sharp ends 106 of ramps 102, 103 are positioned on one side of the spaced and registering tabs 72 and ears 76. When button 102 is depressed so as to move bar 96 partially toward its extended position, as shown in FIG. 5, initial movement of bar 96 causes flat surfaces 110 of the ramps to move over ears 76 for latching the loose portions of floating plate 44 to front cover wall 14, and inclined surfaces 108 of the ramps to cam tabs 72 and pressure plate 48 toward rear cover wall 16. In the fully extended position of bar 96, shown in FIG. 6, tabs 72 rest on flat surfaces 112 on ramps 102, 103, in which position pressure plate 48 and floating plate 44 are spaced apart (see FIG. 7) to form an inlet space or film path 32 along which a film sheet can slide between screen surfaces 50, 54 for loading or unloading the cassette. When the actuating force on buttons 102 are removed and bars 96 are returned by springs 100 to their normal retracted positions, the inclined and flat surfaces 108, 110 are moved out from between tabs 72 and ears 76 as the sharp ends 106 of the ramps are moved clear of the tabs and ears; that is, retracted therefrom.

Figure 16:
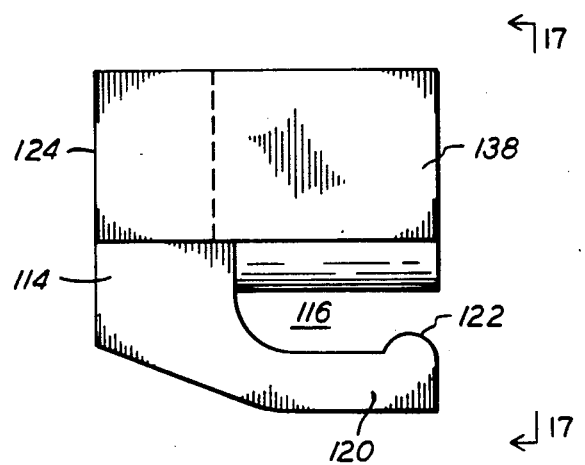
FIG. 16 is a top plan view of a wear block.
Figure 17:
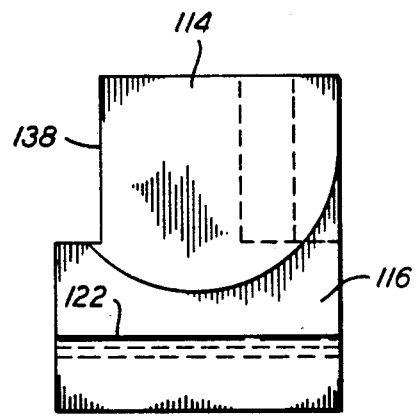
FIG. 17 is an end view of the wear block of FIG. 16.

With reference to FIGS. 16 and 17, a unitary wear block member 114 molded from a low friction material is mounted in each channel 58 for precisely locating a pressure plate tab 72 extending through a cut-out 70 in the inner section 66 of the channel so that the remaining pressure plate tabs 72 are centered in complementary cut-outs 70 extending through the inner section. Accordingly, no rubbing exists between the remaining pressure plate tabs 72 and the edges of the complementary channel cut-outs 70 thereby eliminating the possibility of any dirt being generated therebetween. Each wear block member 114 is mounted within channel 58 (see FIGS. 1 and 2) by a slot 116 in the wear block member receiving a flange on inner section 66. The slot defines a finger 120 on wear block member 114 having an inner lip 122 engageable with a notch, not shown, on the inner section for releasably securing the wear block member to the inner section. An end surface 124 of wear block member 114 cooperates with an edge of a cut-out 70 on inner section 66 for precisely locating pressure plate tab 72 extending therethrough.

Figure 6:
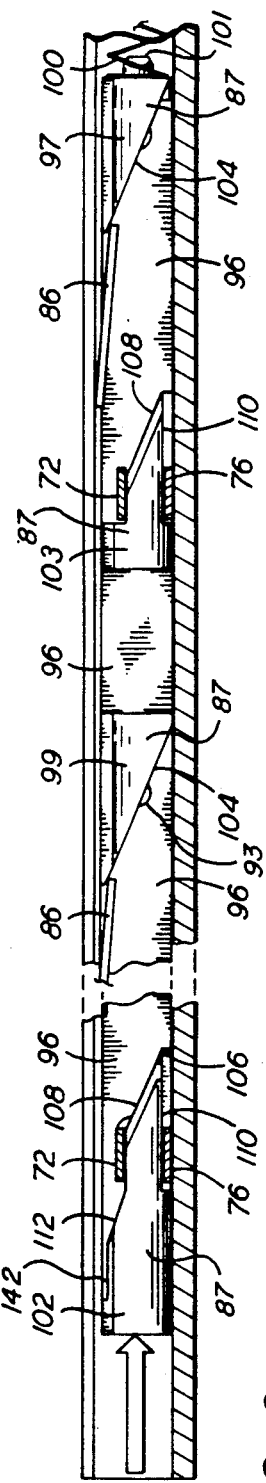
FIG. 6 is a view similar to FIGS. 4 and 5 showing the position of the push-bar mechanism in its fully extended position.

Referring again to FIGS. 1 and 2, near end wall 24 and extending parallel therewith from side wall 18 to side wall 20 is a light shield 126 configured and disposed to shield film sheet F from any light that might enter chamber 26 through slot 30. Shield 126 is rockably mounted between plate 48 and rear wall 16 with a tab 128 projecting laterally from each end thereof across medial section 64 of each side wall 20 and resting on an inclined shoulder 129 on inner section 66 (FIGS. 1 and 2). Shield 126 has a lip 130 which projects angularly and forwardly toward a groove 132 adjacent to slot 30. Secured to and projecting from the rear of tab 128 is a leaf spring 134 having a free end portion 136 bearing resiliently upon a flat upper surface 138 of wear block member 114. In the normal retracted position of bar 96, shown in FIGS. 1 and 3, wherein pressure plate 48 and screen 50 hold the film sheet F flat against screen 54 and floating plate 44, springs 134 and rear cover wall 16 keep shield 126 in its forward, light-shielding position wherein lip 130 is held in groove 132 so as to block passage of any light through slot 30. In this condition, the cassette is said to be closed. When bar 96 is moved to its extended position, as shown in FIG. 6, for separating the pressure and floating plates 48, 44 respectively, another inclined surface 140 terminating in a flat support surface 142 on push-button ramp 102 engages tabs 128 and pivotably cams light shield 126 rearwardly against the biasing influence of springs 134. Shield 126 pivots upwardly about its rear edge and upper surface 138 until lip 130 has left groove 132 and has cleared slot 30, as seen dotted in FIG. 2, thereby allowing film sheet F to move into or out of the space between screens 50 and 54. In this condition, the cassette is said to be open.

Additional light sealing is provided, as seen in FIG. 1, by a thin flexible plastic opaque cape 144 of the same length as the light shield, and of a rectangular shape. One long edge 146 of cape 144 is secured to a rear edge of light shield 126 by adhesive or the like, and the opposite line edge 148 is free and rests on top of spring assemby bar 82. The short ends 150, only one of which is shown in part, extend to the outer sections 62 if channels 58 and over leaf springs 134. Accordingly, additional light sealing is obtained along the ends of the light shield 126, along the rear edge of the light shield, and along the contact line between the inner surface of rear cover wall 16 and spring assembly bar 82.

The invention has been described in detail with particular reference to a preferred embodiment thereof, but it will be understood that variations and modifications can be effected within the spirit and scope of the invention.

What is claimed is:

1. In an x-ray cassette having one end wall with a slot therein through which a sheet is moveable therethrough along an inlet path, an opposite end wall, opposite side walls joining the one end wall and opposite end walls wherein each side wall comprises a channel having spaced cut-outs therein, opposing front and rear cover walls joined to the end walls and side walls, a pressure plate adjacent the rear cover wall having laterally extending tabs on opposite side edges thereof extending into the channels through the cut-outs therein, a floating plate adjacent the front cover wall, the pressure and floating plates having substantially planar interior surfaces in substantially parallel, facing relationship with each other to support the sheet therebetween, pressure applying means for normally biasing the pressure plate toward the floating plate to press the sheet flat between the interior surfaces, a push-bar mechanism mounted in each channel for slidable movement between a normal retracted position and an extended position, and a spring in each channel coupled to the push-bar mechanism for urging it into its normal retracted position, the improvement comprising:

ears laterally extending from the side edges of the floating plate in register with and spaced from the tabs; and ramps longitudinally spaced on each push-bar mechanism adapted when the push-bar mechanism is in its normal retracted position to be clear of the ears and tabs, the ramps adapted when the push-bar mechanism is moved to its extended position to enter the space between the ears and tabs and to engage the tabs and move the pressure plate toward the rear cover wall, and to override the ears for latching the floating plate to the front cover wall so that the pressure and floating plates are spaced apart for allowing a sheet to freely move into or exit the cassette along the inlet path.

2. An x-ray cassette according to claim 1 wherein each ramp has an inclined surface facing the rear cover wall.

3. An x-ray cassette according to claim 2 wherein each ramp is a unitary member formed of a low friction material to reduce dirt generation.

4. An x-ray cassette according to claim 1 wherein each channel has an asymmetrical cross-section, and each push-bar mechanism has a complementary asymmetrical cross-section for minimizing the frictional engagement surfaces between each push-bar mechanism and supporting channel.

5. An x-ray cassette according to claim 2 wherein the cassette has an elongate groove along the one end wall thereof, and a support member mounted in each channel, the cassette further comprising light trap means for the slot in the one end wall of the cassette, the light trap means comprising an elongate rectangular light shield having a lip along a front edge thereof nestable in the elongate groove to prevent light from entering the slot, a shoulder at each end of the light shield extending into one of the channels and into the path of one of the ramps, and a leaf spring extending from each shoulder rearwardly of the front edge onto the support member for biasing the lip into light-tight engagement with the groove so that movement of the push-bar mechanisms from their normal retracted positions to their extended positions causes the ramps to engage the shoulders for pivoting the light shield about the support members for further tensioning the leaf springs while retracting the lip from the groove to allow passage of a film sheet into or out of the cassette.

6. An x-ray cassette according to claim 5 wherein the pressure applying means comprises an elongate bar extending across the cassette from one channel to the opposite channel, and wherein the light trap means further comprises a flexible, elongate, opaque cape of the same length as the light shield and having one edge thereof secured to a rear edge of the light shield, the opposite edge of the cape resting on the elongate bar so that when the push-bar mechanism is in its normal retracted position, the elongate bar presses the cape against the rear cover wall in light-tight relation.

7. An x-ray cassette according to claim 5 wherein each channel comprises outer, medial and inner sections of each side wall, and wherein each inner section has spaced cut-outs therethrough, and each support member is secured to the inner section for precisely locating a pressure plate tab exgending through an inner section cut-out so that the remaining pressure plate tabs are centered in complementary cut-outs so that no dirt is generated by the remaining tabs because there is no rubbing between the remaining tabs and edges of the complementary inner section cut-outs.

8. An x-ray cassette according to claim 1 wherein each ramp has an inclined surface facing the rear cover wall, wherein each channel has an asymmetrical cross-section, and each push-bar mechanism has a complementary asymmetrical cross-section for minimizing the frictional engagement surfaces between each push-bar mechanism and supporting channel; and wherein the cassette has an elongate groove along the one end wall thereof, and a support member in each channel, the cassette further comprising light trap means for the slot in the one end wall of the cassette, the light trap means comprising an elongate rectangular light shield having a lip along a front edge thereof nestable in the elongate groove to prevent light from entering the slot, a shoulder at each end of the light shield extending into one of the channels and into the path of one of the ramps, and a leaf spring extending from each shoulder rearwardly of the front edge onto the support member for biasing the lip into light-tight engagement with the groove so that movement of the push-bar mechanisms from their normal retracted positions to their extended positions causes the ramps to engage the shoulders for pivoting the light shield about the support members for tensioning the leaf springs while retracting the lip from the groove to allow passage of a film sheet into or out of the cassette.

9. An x-ray cassette according to claim 8 wherein the pressure applying means comprises an elongate bar extending across the cassette from one channel to the opposite channel, and wherein the light trap means further comprises a flexible, elongate, opaque cape of the same length as the light shield and having one edge thereof secured to a rear edge of the light shield, the opposite edge of the cape resting on the elongate bar so that when the push-bar mechanism is in its normal retracted position, the elongate bar presses the cape against the rear cover wall in light tight relation.

10. An x-ray cassette according to claim 8 wherein each channel comprises outer, medial and inner sections of each side wall, and wherein each inner section has spaced cut-outs therethrough, and each support member is secured to the inner section for precisely locating a pressure plate tab extending through an inner section cut-out so that the remaining pressure plate tabs are centered in complementary cut-outs so that no dirt is generated by the remaining tabs because there is no rubbing between the remaining tabs and edges of the complementary inner section cut-outs.

11. An x-ray cassette according to claim 8 wherein the pressure applying means comprises an elongate bar extending across the cassette from one channel to the opposite channel, and wherein the light trap means further comprises a flexible, elongate, opaque cape of the same length as the light shield and having one edge thereof secured to a rear edge of the light shield, the opposite edge of the cape resting on the elongate bar so that when the push-bar mechanism is in its normal retracted position, the elongate bar presses the cape against the rear cover wall in light tight relation; wherein each channel comprises outer, medial and inner sections of each side wall, and wherein each inner section has spaced cut-outs therethrough, and each support member is secured to the inner section for precisely locating a pressure plate tab extending through an inner section cut-out so that the remaining pressure plate tabs are centered in complementary cut-outs so that no dirt is generated by the remaining tabs because there is no rubbing between the remaining tabs and edges of the complementary inner section cut-outs.

* * * * *

UNITED STATES PATENT AND TRADEMARK OFFICE
CERTIFICATE OF CORRECTION

PATENT NO. : 4,813,063
DATED : March 14, 1989
INVENTOR(S) : E. P. Carmichael et al.

It is certified that error appears in the above-identified patent and that said Letters Patent is hereby corrected as shown below:

| | |
|---|---|
| Left Column, Cover, after Inventors: | "Even" should read --Evan-- |
| Column 1, Line 43 | "boxed" should read --bowed-- |
| Column 1, Line 49 | "boxed" should read --bowed-- |
| Column 3, Line 8 | after "tab" insert --because there is no rubbing between the remaining tabs-- |
| Column 4, Line 40 | after "shown" insert --,-- |
| Column 5, Line 24 | "97,99" should read --97, 99-- |
| Column 5, Line 57 | replace "," with --.-- |
| Column 7, Line 23 | "line" should read --long-- |
| Column 8, Line 54 | "exgending" should read --extending-- |

Signed and Sealed this

Tenth Day of July, 1990

*Attest:*

HARRY F. MANBECK, JR.

*Attesting Officer*  *Commissioner of Patents and Trademarks*